(12) United States Patent
Chen

(10) Patent No.: US 6,896,946 B2
(45) Date of Patent: May 24, 2005

(54) INITIATION-FREE SUPER-RESOLUTION OPTICAL MEDIUM

(75) Inventor: Bing-Mau Chen, Nantou (TW)

(73) Assignee: Ritek Corporation, Hsin Chu Industrial Park (TW)

( * ) Notice: Subject to any disclaimer, the term of this patent is extended or adjusted under 35 U.S.C. 154(b) by 0 days.

(21) Appl. No.: 10/453,033

(22) Filed: Jun. 3, 2003

(65) Prior Publication Data

US 2003/0228462 A1 Dec. 11, 2003

(30) Foreign Application Priority Data

Jun. 6, 2002 (TW) ........................................ 91112484 A

(51) Int. Cl.⁷ ................................................. B32B 3/02
(52) U.S. Cl. .................... 428/64.1; 428/64.4; 428/64.5; 428/64.6; 430/270.13
(58) Field of Search .............................. 428/64.1, 64.4, 428/64.5, 64.6, 913; 430/270.13, 495.1, 945

(56) References Cited

U.S. PATENT DOCUMENTS

| | | | | |
|---|---|---|---|---|
| 6,153,355 A | * | 11/2000 | Takahashi et al. | ..... 430/270.13 |
| 6,416,837 B1 | * | 7/2002 | Kojima et al. | ............. 428/64.1 |
| 6,432,502 B1 | * | 8/2002 | Kitaura et al. | ............. 428/64.1 |
| 6,479,121 B1 | * | 11/2002 | Miura et al. | ................ 428/64.1 |
| 6,511,788 B1 | * | 1/2003 | Yasuda et al. | .......... 430/270.13 |
| 6,551,679 B1 | * | 4/2003 | Kuroda et al. | ............. 428/64.1 |
| 2002/0051422 A1 | * | 5/2002 | Sugiura et al. | ........... 369/275.1 |
| 2002/0154596 A1 | * | 10/2002 | Hsu et al. | .................... 369/288 |
| 2004/0257968 A1 | * | 12/2004 | Kim et al. | ................ 369/275.2 |

* cited by examiner

Primary Examiner—Elizabeth Mulvaney
(74) Attorney, Agent, or Firm—Quintero Law Office

(57) ABSTRACT

An initiation-free super-resolution optical medium. The optical medium includes, in sequence, a substrate with a first dielectric layer thereon, an active layer on the first dielectric layer to absorb laser beam, a second dielectric layer on the active layer, an initiation-free recording layer on the second dielectric layer, and a third dielectric layer on the initiation-free recording layer.

34 Claims, 2 Drawing Sheets

INITIATION-FREE SUPER-RESOLUTION OPTICAL MEDIUM

BACKGROUND OF THE INVENTION

1. Field of the Invention

The present invention relates to an optical storage medium, and more particularly to a super-resolution optical medium using an initiation-free layer.

2. Description of the Prior Art

Optical storage media (such as CD, CD-R, CD-RW, and DVD) uses a laser beam irradiating through an objective lens onto a recording layer for optical reading or writing. A recorded mark size is limited by the diffraction limit depending on the wavelength ($\lambda$) of the laser beam and the numerical aperture (NA) of the lens, that is, 0.61 $\lambda$/NA. Therefore, in order to effectively minimize the mark size to enhance the recording density of the optical storage medium, one can use a light source with a shorter wavelength or increase the numerical aperture of the lens. However, when the optical head develops to DVD-R (digital versatile disc recordable) medium ($\lambda$=405 nm, NA=0.85), the wavelength of the laser beam cannot be further shortened, and the NA of the lens cannot be further increased.

In order to further enhance the recording density of the optical storage medium, the near-field optical recording technique has been proposed, for example, the near-field solid immersion lens (SIL) method and the scanning near-field optical microscope (SNOM) method. However, the above-mentioned near-field optical player suffers from difficult fabrication, slow data reading speed, and lack of player portability.

In view of the above drawbacks, Junji Tominaga in 1998 published "Super-resolution Structure for Optical Data Storage by Near-Field Optics", J. Tominaga, T. Nakano, and N. Atoda, *Proc. SPIE* 3467, 282 (1998) and then "The Characteristics and the Potential of Super Resolution Near-Field Structure", J. Tominaga, H. Fuji, A. Sato, T. Takanno, T. Fukaya, N. Atoda, *Jpn. J. Appl. Phys.* 39, 957 (2000). The research provided a breakthrough in the near-field optical recording technique, described below.

FIG. 1 shows a cross-section of a conventional super-resolution optical near-field structure ("super-RENS") using silver oxide (AgO). The super-resolution optical medium includes, in sequence, a pre-grooved polycarbonate substrate 10, a ZnS—$SiO_2$ dielectric layer 12 with a thickness of about 130 nm, a AgO active layer 14 with a thickness of about 15 nm, a ZnS—$SiO_2$ dielectric layer 16 with a thickness of about 40 nm, an amorphous $Ge_2Sb_2Te_5$ alloy recording layer 18 with a thickness of about 20 nm, and a ZnS—$SiO_2$ dielectric layer 20 with a thickness of about 20 nm. When reading, the active layer 14 can absorb the laser beam to form near-field optical effect and generate surface plasma, that is, form a super-resolution optical structure.

The super-resolution principle uses the active layer to absorb the laser beam. When the laser beam passes through the active layer, the optical near-field strength is enhanced by the surface plasma of the active layer. Thus, a very small recorded mark size, even less than the optical diffraction limit, is obtained. In addition, non-linear change on optical properties can also be used. When the laser beam is focused on the active layer, the energy distribution is Gauss distribution, and the rotational substrate causes uneven temperature distribution on the active layer. Also, since the transmittal of the active layer is dependent on the temperature in non-linear relationship, different transmittances for the incident laser beam result at various temperatures. Therefore, the light intensity distribution on the active layer and the light intensity distribution on the recording layer are different. Transmittance change with different light strength distributions can decrease the exposure area of the recording layer, thus achieving super resolution.

In order to improve the carrier to noise ratio (CNR), the as-produced medium must be subjected to a so-called initiation process, in which the recording layer 18 is converted from amorphous to crystalline state by thermal energy. However, the conventional super-resolution optical medium has problems in the initiation process. For example, temperatures as high as 200° C. will damage the active layer 14 of the super-resolution near-field optical medium. Moreover, the initiation facility is expensive and the initiation process is very time-consuming.

SUMMARY OF THE INVENTION

An object of the present invention is to provide an initiation-free super-resolution rewritable optical medium which uses an initiation-free recording layer to replace the conventional recording layer. The signal to noise ratio can be effectively enhanced and the life of the medium can be lengthened.

Another object of the present invention is to provide an initiation-free super-resolution rewritable optical medium with decreased production cost.

To achieve the above objects, the initiation-free super-resolution optical medium of the present invention includes in sequence: a substrate; a first dielectric layer on the substrate; an active layer on the first dielectric layer; a second dielectric layer on the active layer; an initiation-free recording layer on the second dielectric layer; and a third dielectric layer on the initiation-free recording layer.

According to the present invention, when reading signal, the initiation-free super-resolution optical medium uses a nanometer-scaled active layer to absorb the laser beam, thus forming surface plasma and near-field optical effect, or forming optical non-linear change. Thus, a re-readable and rewritable optical medium with super high recording density is obtained. Moreover, the initiation-free recording layer prevents problems caused by the conventional super-resolution optical medium during the initiation process, for example, the active layer property degrading from high temperatures. Moreover, the signal to noise ratio of the super-resolution optical medium can be improved.

The initiation-free super-resolution optical medium can further include a reflective layer formed on the third dielectric layer and a UV resin protective layer formed on the reflective layer.

The first dielectric layer can have a thickness of 10 nm to 200 nm and can be made of silicon nitride, ZnS—$SiO_2$, aluminum nitride, SiC, germanium nitride, titanium nitride, tantalum oxide, aluminum oxide, or yttrium oxide.

The active layer can have a thickness of 1 nm to 100 nm and can be made of silver oxide, vanadium oxide, zinc oxide, gallium oxide, germanium oxide, arsenic oxide, selenium oxide, indium oxide, tellurium oxide, antimony oxide, platinum oxide, germanium (Ge), tellurium (Te), antimony (Sb), or a metal alloy of at least two metals selected from Ge, Te, Sb, In, and Ag.

The second dielectric layer can have a thickness of 1 nm to 100 nm and can be made of silicon nitride, ZnS—$SiO_2$, aluminum nitride, SiC, germanium nitride, titanium nitride, tantalum oxide, aluminum oxide, or yttrium oxide.

The initiation-free recording layer can have a thickness of 1 nm to 60 nm and can be made of Ge, Te, Sb, In, Ag, or mixtures thereof. In addition, the initiation-free recording layer can be made of Ge, Te, Sb, In, Ag, or mixtures thereof, further doped with a doping metal of Se, Zn, Mo, Sn, Bi, V, or mixtures thereof.

The initiation-free super-resolution optical medium can further include a first crystallization assisted layer on the upper surface of the initiation-free recording layer, and a second crystallization assisted layer on the lower surface of the initiation-free recording layer. The first and second crystallization assisted layers can have a thickness of 1 nm to 60 nm and can be formed of Ge, Te, Sb, Bi, In, Ag, or mixtures thereof. When the first and second crystallization assisted layers are formed of Te, that is, a telluride, the telluride can be $Sb_2Te_3$, SnTe, PbTe, GeTe—$Sb_2Te_3$ eutectic compositions or GeTe—$Bi_2Te_3$ eutectic compositions. Alternatively, the first and second crystallization assisted layers can have a thickness of 1 nm to 60 nm and can be formed of a halogenide, and the halogenide can be $ZnF_2AWF_3$, KF, $CaF_2$, NaF, $BaF_2$, $MgF_2$, $LaF_3$, or LiF.

The first and second crystallization assisted layers should exhibit high crystallization speed, low crystallization temperature, crystalline structure and lattice constant similar to the initiation-free recording layer, and high adhesion force to the initiation-free recording layer.

The third dielectric layer can have a thickness of 2 nm to 80 nm and can be made of silicon nitride, ZnS—$SiO_2$, aluminum nitride, SiC, germanium nitride, titanium nitride, tantalum oxide, aluminum oxide, or yttrium oxide.

The initiation-free super-resolution optical medium can further include a thermal control layer. The thermal control layer can be formed on or beneath the first dielectric layer, on or beneath the second dielectric layer, or on or beneath the third dielectric layer. Alternatively, the thermal control layer can be interposed in any one of the dielectric layers. That is, the thermal control layer can be interposed in either the first, the second, or the third dielectric layer. The thermal control layer can be made of gold, silver, silicon carbide, silicon, or aluminum oxide.

The initiation-free recording layer can be a crystalline alloy layer formed by sputtering.

To achieve the above objects, the present invention provides an optical information storage medium, which includes an initiation-free recording layer and a super-resolution optical structure. The super-resolution optical structure is on a side of the initiation-free recording layer adjacent to a laser light source, such that the optical information storage medium has the ability to read and write optical information with super resolution, and the recording layer is a crystalline recording layer.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
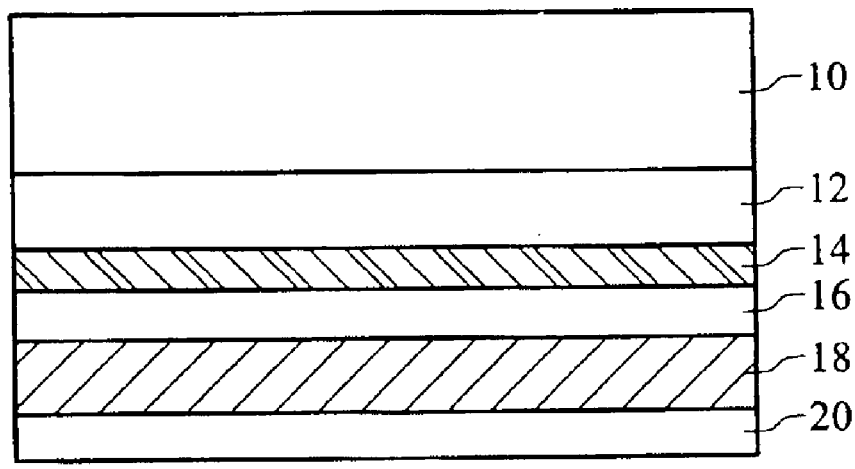
FIG. 1 is a cross-section illustrating the conventional super-resolution optical near-field structure.
Figure 2:
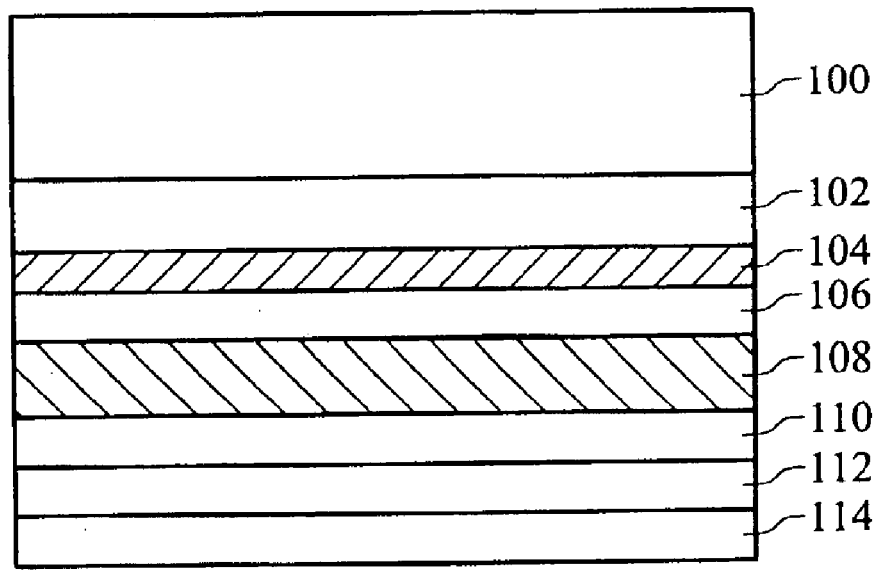
FIG. 2 is a cross-section illustrating the initiation-free super-resolution optical medium of the present invention.
Figure 3:
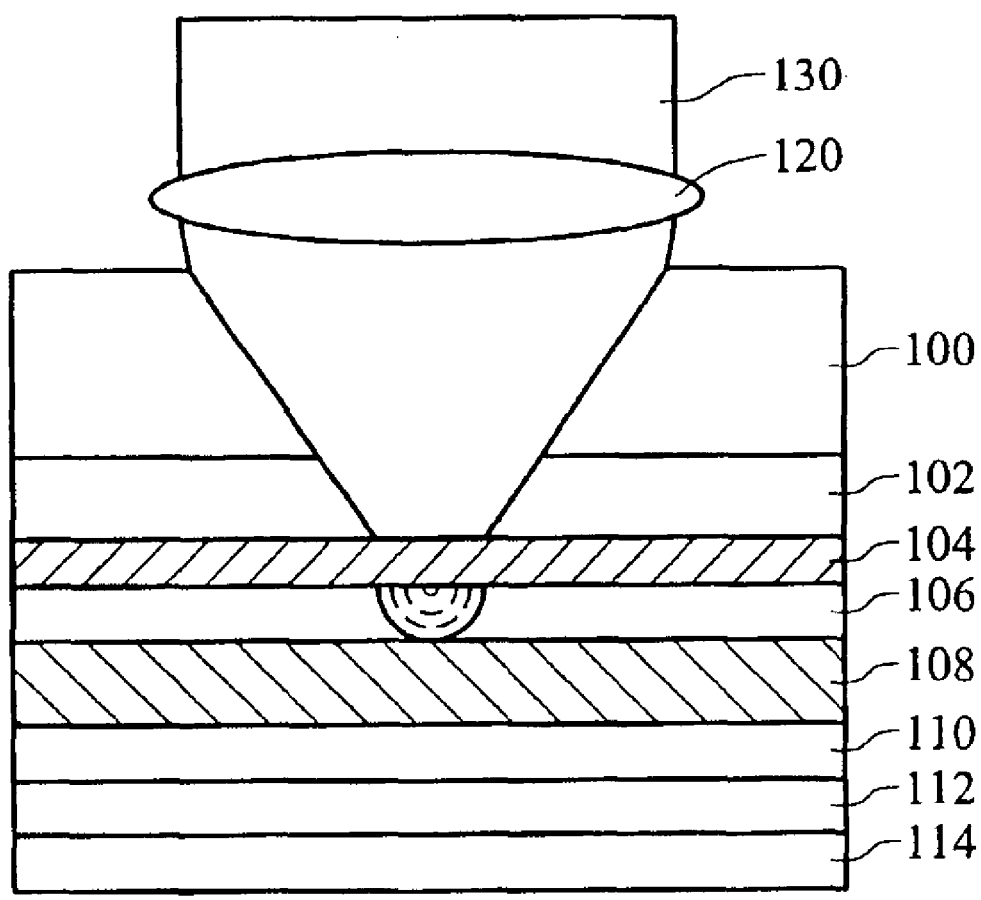
FIG. 3 is a cross-section illustrating reading from and writing to the initiation-free super-resolution optical medium of the present invention.
Figure 4:
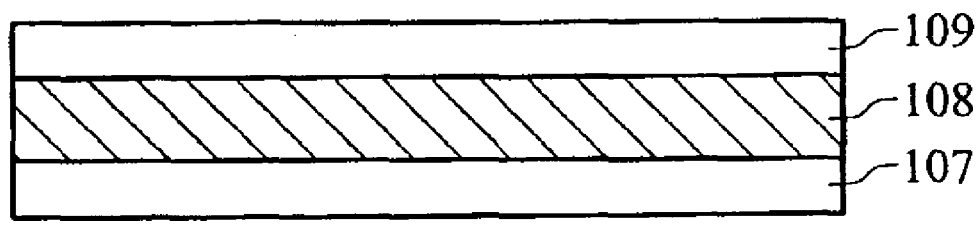
FIG. 4 is a cross-section illustrating the initiation-free recording layer of the present invention.

FIG. 2 is a cross-section illustrating the initiation-free super-resolution optical medium of the present invention, and FIG. 3 shows reading from and writing to the initiation-free super-resolution optical medium.

Referring to FIGS. 2 and 3, the super-resolution optical medium includes, in sequence, a substrate 100, a first dielectric layer 102 with a thickness of 10–200 nm on the substrate 100, an active layer 104 with a thickness of 1–100 nm on the first dielectric layer 102, a second dielectric layer 106 with a thickness of 1–100 nm on the active layer 104, an initiation-free recording layer 108 with a thickness of 1–60 nm on the second dielectric layer 106, a third dielectric layer 110 with a thickness of 2–80 nm on the initiation-free recording layer 108, a reflective layer 112 made of Ag, Au, or AlTi alloy, and a resin protective layer 114. In FIG. 3, the symbol 120 indicates a lens, and the symbol 130 indicates a laser beam having a wavelength of 200 to 850 nm.

The substrate 100 is pre-grooved and made of a transparent polycarbonate material. The first dielectric layer 102 is formed on the substrate 100 and is made of silicon nitride, ZnS—$SiO_2$, aluminum nitride, SiC, germanium nitride, titanium nitride, tantalum oxide, aluminum oxide, or yttrium oxide. The active layer 104 is formed on the first dielectric layer 102 and is made of silver oxide, vanadium oxide, zinc oxide, gallium oxide, germanium oxide, arsenic oxide, selenium oxide, indium oxide, tellurium oxide, antimony oxide, platinum oxide, germanium (Ge), tellurium (Te), antimony (Sb), or a metal alloy of at least two metals selected from Ge, Te, Sb, In, and Ag. The active layer 104 can absorb the laser beam during writing (reading) to form near-field optical effect or optical non-linear change and generate surface plasma, that is, form super-resolution near-field optical effect. In addition, the second dielectric layer 106 is formed on the active layer 104 and can be made of the same material as the first dielectric layer 102.

The initiation-free recording layer 108 can be made of Ge, Te, Sb, In, Ag, or mixtures thereof. Preferably, the initiation-free recording layer is made of Ge, Te, Sb, In, Ag, or mixtures thereof, further doped with a doping metal of Se, Zn, Mo, Sn, Bi, V, or mixtures thereof. The initiation-free recording layer 108 can be formed by sputtering on the second dielectric layer 106 to crystalline state. That is, there is no need to initiate the initiation-free recording layer 108 with additional thermal energy.

In order to enhance the initiation-free effect, a first crystallization assisted layer 109 can be formed on the upper surface of the initiation-free recording layer 108, and a second crystallization assisted layer 107 can be formed on the lower surface of the initiation-free recording layer 108. The first and second crystallization assisted layers 109 and 107 can have a thickness of 1 nm to 60 nm and can be formed of Ge, Te, Sb, Bi, In, Ag, or mixtures thereof. When the first and second crystallization assisted layers are formed of Te, that is, a telluride, the telluride can be $Sb_2Te_3$, SnTe, PbTe, GeTe—$Sb_2Te_3$ eutectic compositions or GeTe—$Bi_2Te_3$ eutectic compositions. Alternatively, the first and second crystallization assisted layers can have a thickness of 1 nm to 60 nm and can be formed of a halogenide, and the halogenide can be $ZnF_2AWF_3$, KF, $CaF_2$, NaF, $BaF_2$, $MgF_2$, $LaF_3$, or LiF. A representative example of the first and second crystallization assisted layers can be a $Sb_2Te_3$ layer.

The $Sb_2Te_3$ layer has very fast crystallization speed and low crystallization temperature. Also, in the ion bombardment procedure during sputtering, the crystalline initiation-free recording layer can be successfully obtained.

The third dielectric layer 110 is formed on the initiation-free recording layer 108 and can be made of the same material as the first dielectric layer 102.

In addition, in order to improve the thermal stability of the optical medium, a thermal control layer (not shown) can be formed. The thermal control layer can be formed on or beneath the first dielectric layer 102, on or beneath the second dielectric layer 106, or on or beneath the third dielectric layer 110. Alternatively, the thermal control layer can be interposed in any one of the dielectric layers. That is, the thermal control layer can be interposed in either the first dielectric layer 102, the second dielectric layer 106, or the third dielectric layer 110. The thermal control layer can be made of gold, silver, silicon carbide, silicon, or aluminum oxide.

The reflective layer 112 is used for absorbing heat, as a heat sink, and for providing better reflectivity of the optical medium. The resin protective layer 114 can be a UV resin protective layer and is used to protect the initiation-free super-resolution optical multi-layered structure from external damage.

Referring to FIG. 3, the working mechanism of the initiation-free super-resolution optical medium of the present invention is described. For example, a laser beam 130 focuses through a lens 120, then transmits through a first dielectric layer 102 and the active layer 104, and then focuses onto the initiation-free recording layer 108. The portion of the recording layer 108 irradiated by the laser beam 130 will have increased temperature. The active layer 104 absorbs the laser beam 130 to form the surface plasma near-field effect or optical non-linear effect. In addition, the mark size written or read by the initiation-free recording layer 108 is less than the diffraction limit.

In conclusion, the present invention combines super-resolution and the initiation-free recording layer to form the initiation-free super-resolution optical medium. The conventional recording layer is replaced by the initiation-free recording layer. The signal to noise ratio is effectively improved and the optical medium production cost is decreased.

The foregoing description of the preferred embodiments of this invention has been presented for purposes of illustration and description. Obvious modifications or variations are possible in light of the above teaching. The embodiments chosen and described provide an excellent illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. An initiation-free super-resolution optical medium, comprising, in sequence:
   a substrate;
   a first dielectric layer on the substrate;
   an active layer on the first dielectric layer;
   a second dielectric layer on the active layer;
   an initiation-free recording layer on the second dielectric layer; and
   a third dielectric layer on the initiation-free recording layer.

2. The initiation-free super-resolution optical medium as claimed in claim 1, further comprising a reflective layer formed on the third dielectric layer.

3. The initiation-free super-resolution optical medium as claimed in claim 2, wherein the reflective layer is made of Ag, Au, or AlTi alloy.

4. The initiation-free super-resolution optical medium as claimed in claim 2, further comprising a resin protective layer formed on the reflective layer.

5. The initiation-free super-resolution optical medium as claimed in claim 1, wherein the first dielectric layer has a thickness of 10 nm to 200 nm and is made of silicon nitride, $ZnS-SiO_2$, aluminum nitride, SiC, germanium nitride, titanium nitride, tantalum oxide, aluminum oxide, or yttrium oxide.

6. The initiation-free super-resolution optical medium as claimed in claim 1, wherein the active layer has a thickness of 1 nm to 100 nm and is made of silver oxide, vanadium oxide, zinc oxide, gallium oxide, germanium oxide, arsenic oxide, selenium oxide, indium oxide, tellurium oxide, antimony oxide, platinum oxide, germanium (Ge), tellurium (Te), antimony (Sb), or a metal alloy of at least two metals selected from Ge, Te, Sb, In, and Ag.

7. The initiation-free super-resolution optical medium as claimed in claim 1, wherein the second dielectric layer has a thickness of 1 nm to 100 nm and is made of silicon nitride, $ZnS-SiO_2$, aluminum nitride, SiC, germanium nitride, titanium nitride, tantalum oxide, aluminum oxide, or yttrium oxide.

8. The initiation-free super-resolution optical medium as claimed in claim 1, wherein the initiation-free recording layer has a thickness of 1 nm to 60 nm and is made of Ge, Te, Sb, In, Ag, or mixtures thereof.

9. The initiation-free super-resolution optical medium as claimed in claim 8, wherein the initiation-free recording layer is made of Ge, Te, Sb, In, Ag, or mixtures thereof, further doped with a doping metal of Se, Zn, Mo, Sn, Bi, V, or mixtures thereof.

10. The initiation-free super-resolution optical medium as claimed in claim 1, wherein the initiation-free recording layer has an upper surface and a lower surface, and wherein the initiation-free super-resolution disc further includes:
    a first crystallization assisted layer on the upper surface of the initiation-free recording layer; and
    a second crystallization assisted layer on the lower surface of the initiation-free recording layer.

11. The initiation-free super-resolution optical medium as claimed in claim 10, wherein the first and second crystallization assisted layers have a thickness of 1 nm to 60 nm and are formed of Ge, Te, Sb, Bi, In, Ag, or alloys thereof.

12. The initiation-free super-resolution optical medium as claimed in claim 11, wherein the first and second crystallization assisted layers are formed of a telluride.

13. The initiation-free super-resolution optical medium as claimed in claim 12, wherein the telluride is $Sb_2Te_3$, SnTe, PbTe, GeTe—$Sb_2Te_3$ eutectic compositions or GeTe—$Bi_2Te_3$ eutectic compositions.

14. The initiation-free super-resolution optical medium as claimed in claim 10, wherein the first and second crystallization assisted layers have a thickness of 1 nm to 60 nm and are formed of a halogenide.

15. The initiation-free super-resolution optical medium as claimed in claim 14, wherein the halogenide is $ZnF_2AWF_3$, KF, $CaF_2$, NaF, $BaF_2$, $MgF_2$, $LaF_3$, or LiF.

16. The initiation-free super-resolution optical medium as claimed in claim 1, wherein the third dielectric layer has a thickness of 2 nm to 80 nm and is made of silicon nitride, ZnS—SiO$_2$, aluminum nitride, SiC, germanium nitride, titanium nitride, tantalum oxide, aluminum oxide, or yttrium oxide.

17. The initiation-free super-resolution optical medium as claimed in claim 1, further comprising a thermal control layer formed on or beneath, or interposed in either the first, the second, or the third dielectric layer.

18. The initiation-free super-resolution optical medium as claimed in claim 17, wherein the thermal control layer is made of gold, silver, silicon carbide, silicon, or aluminum oxide.

19. The initiation-free super-resolution optical medium as claimed in claim 1, wherein the initiation-free recording layer is formed by sputtering.

20. The initiation-free super-resolution optical medium as claimed in claim 1, wherein the initiation-free recording layer is a crystalline recording layer.

21. An optical information storage medium, comprising an initiation-free recording layer and a super-resolution optical structure, wherein the super-resolution optical structure is on a side of the initiation-free recording layer adjacent to a laser light source, such that the optical information storage medium has the ability to read and write optical information with super resolution, and wherein the recording layer is a crystalline recording layer.

22. The optical information storage medium as claimed in claim 21, wherein the super-resolution optical structure includes:

a first dielectric layer;

an active layer on the first dielectric layer; and a second dielectric layer on the active layer.

23. The optical information storage medium as claimed in claim 22, wherein the first dielectric layer has a thickness of 10 nm to 200 nm and is made of silicon nitride, ZnS—SiO$_2$, aluminum nitride, SiC, germanium nitride, titanium nitride, tantalum oxide, aluminum oxide, or yttrium oxide.

24. The optical information storage medium as claimed in claim 22, wherein the active layer has a thickness of 1 nm to 100 nm and is made of silver oxide, vanadium oxide, zinc oxide, gallium oxide, germanium oxide, arsenic oxide, selenium oxide, indium oxide, tellurium oxide, antimony oxide, platinum oxide, germanium (Ge), tellurium (Te), antimony (Sb), or a metal alloy of at least two metals selected from Ge, Te, Sb, In, and Ag.

25. The optical information storage medium as claimed in claim 22, wherein the second dielectric layer has a thickness of 1 nm to 100 nm and is made of silicon nitride, ZnS—SiO$_2$, aluminum nitride, SiC, germanium nitride, titanium nitride, tantalum oxide, aluminum oxide, or yttrium oxide.

26. The optical information storage medium as claimed in claim 21, wherein the initiation-free recording layer further includes a crystallization assisted layer.

27. The optical information storage medium as claimed in claim 21, wherein the initiation-free recording layer has a thickness of 1 nm to 60 nm and is made of Ge, Te, Sb, In, Ag, or thereof.

28. The optical information storage medium as claimed in claim 27, wherein the initiation-free recording layer is made of Ge, Te, Sb, In, Ag, or mixtures thereof, further doped with a doping metal of Se, Zn, Mo, Sn, Bi, V, or mixtures thereof.

29. The optical information storage medium as claimed in claim 21, wherein the crystallization assisted layer has a thickness of 1 nm to 60 nm and is formed of Ge, Te, Sb, Bi, In, Ag, or mixtures thereof.

30. The optical information storage medium as claimed in claim 29, wherein the crystallization assisted layer is formed of a telluride.

31. The optical information storage medium as claimed in claim 30, wherein the telluride is Sb$_2$Te$_3$, SnTe, PbTe, GeTe—Sb$_2$Te$_3$ eutectic compositions or GeTe—Bi$_2$Te$_3$ eutectic compositions.

32. The optical information storage medium as claimed in claim 26, wherein the crystallization assisted layer has a thickness of 1 nm to 60 nm and is formed of a halogenide.

33. The optical information storage medium as claimed in claim 32, wherein the halogenide is ZnF$_2$AWF$_3$, KF, CaF$_2$, NaF, BaF$_2$, MgF$_2$, LaF$_3$, or LiF.

34. The optical information storage medium as claimed in claim 21, wherein the initiation-free recording layer is formed by sputtering.

* * * * *